(12) United States Patent
Zhao et al.

(10) Patent No.: US 8,244,693 B2
(45) Date of Patent: Aug. 14, 2012

(54) METHOD AND DEVICE FOR COMPRESSING TABLE BASED ON FINITE AUTOMATA, METHOD AND DEVICE FOR MATCHING TABLE

(75) Inventors: Yuchao Zhao, Shenzhen (CN); Jijun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 12/846,376

(22) Filed: Jul. 29, 2010

(65) Prior Publication Data

US 2010/0293153 A1    Nov. 18, 2010

Related U.S. Application Data

(63) Continuation of application No. PCT/CN2009/070107, filed on Jan. 12, 2009.

(30) Foreign Application Priority Data

Feb. 1, 2008  (CN) .......................... 2008 1 0006079

(51) Int. Cl.
*G06F 17/30* (2006.01)
(52) U.S. Cl. .................. 707/693; 707/741; 707/796
(58) Field of Classification Search .............. 707/687, 707/693, 741, 796, 804
See application file for complete search history.

(56) References Cited

U.S. PATENT DOCUMENTS

| | | | | |
|---|---|---|---|---|
| 5,317,509 A | * | 5/1994 | Caldwell | 704/9 |
| 5,995,963 A | * | 11/1999 | Nanba et al. | 1/1 |
| 7,661,138 B1 | * | 2/2010 | Li | 726/23 |
| 2007/0130140 A1 | * | 6/2007 | Cytron et al. | 707/6 |

FOREIGN PATENT DOCUMENTS

| | | |
|---|---|---|
| CN | 1492359 A | 4/2004 |
| CN | 1538661 A | 10/2004 |
| CN | 1598811 A | 3/2005 |
| CN | 1658704 A | 8/2005 |
| CN | 101499065 B | 11/2011 |

OTHER PUBLICATIONS

Becchi et al. "Memory-Efficient Regular Expression Search Using State Merging," May 2007. INFOCOM 2007. 26th IEEE International Conference on Computer Communications. IEEE , vol., No., pp. 1064-1072.*

Kiraz "Compressed Storage of Sparse Finite-State Transducers" 2001. WIA '99 Revised Papers from the 4th International Workshop on Automata Implementation. pp. 109-121.*

(Continued)

*Primary Examiner* — Shahid Alam
*Assistant Examiner* — James E Richardson
(74) *Attorney, Agent, or Firm* — Brinks Hofer Gilson & Lione (57) ABSTRACT

A method for compressing a table based on finite automata (FA) includes analyzing transferring characteristics of all states in an original two-dimensional structure table and combining continual states with unified transferring characteristics in the original two-dimensional structure table. A method for matching a table based on FA, a device for compressing a table, and a device for matching a table are also provided.

15 Claims, 6 Drawing Sheets

OTHER PUBLICATIONS

Written Opinion of the International Searching Authority issued in corresponding PCT Patent Application No. PCT/CN2009/070107, mailed Apr. 23, 2009.

International Search Report issued in corresponding PCT Application No. PCT/CN2009/070107; mailed Apr. 23, 2009.

Office Action issued in corresponding Chinese Patent Application No. 200810006079.3; mailed Aug. 10, 2011 (including partial English translation).

Notice of Allowance issued in corresponding Chinese Patent Application No. 200810006079.3; mailed Aug. 10, 2011 (including English translation).

English Translation of granted claims issued in corresponding Chinese Patent Application No. 200810006079.3 (including Verification of Translation).

* cited by examiner

METHOD AND DEVICE FOR COMPRESSING TABLE BASED ON FINITE AUTOMATA, METHOD AND DEVICE FOR MATCHING TABLE

CROSS-REFERENCE TO RELATED APPLICATIONS

The application is a continuation of International Application No. PCT/CN2009/070107, filed on Jan. 12, 2009, which claims priority to Chinese Patent Application No. 200810006079.3, filed on Feb. 1, 2008, both of which are hereby incorporated by reference in their entireties.

FIELD OF THE TECHNOLOGY

The present disclosure relates to the field of data structure technology, and more particularly to a method and device for compressing a table based on finite automata (FA) and a method and device for matching a table.

BACKGROUND OF THE DISCLOSURE

Regular expression (RE) describes a character string matching mode and is used for checking whether a character string contains a certain type of sub-string and replacing a matched sub-string or taking a sub-string meeting the matching condition from a certain character string. The RE is a word mode formed by common characters (e.g., characters a to z) and special characters (e.g., metacharacters * and /). A word mode is matched with a found character string through the RE, and the RE is an expression mode commonly used in character string mode matching. Generally, the RE is merely used to express a mode and is required to be converted into finite automata (FA) for being used in a computer to perform high-efficient mode matching. The FA includes several states in which each state will transfer to other states after receiving one or more characters. Each FA has several start states and accept states. When performing matching, the FA starts from a start state and regards characters of a target character string as an input of the current state in sequence. The process is cycled continuously till the accept state is reached or the target character string matching is completed. If a final state is an accept state, the matching is considered to be successful. Otherwise, the matching is considered to be unsuccessful.

Figure 1:
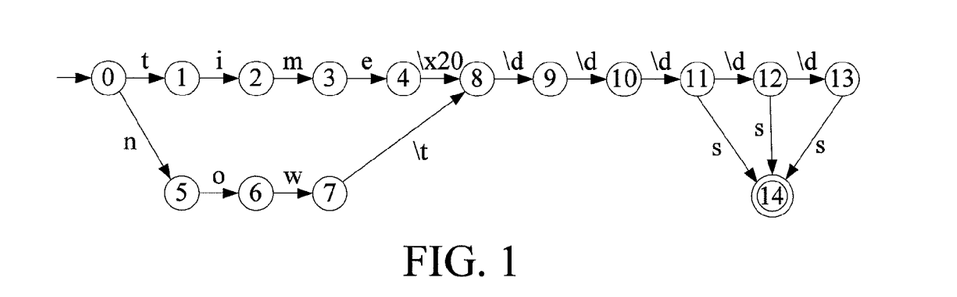
FIG. 1 is a schematic structural view of state transferring of current FA.

Taking RE "(time\x20|now\t)\d{3,5}s" as an example, "\x20" is a hexadecimal expression of ASCII value of a blank, "\d" represents any numeral from 0 to 9, "\t" represents a tab, "|" represents logic "or", "time\x20" represents a continuous character string, and "{3,5}" represents that the repeating number of a numeral is at least three and at most five. The RE is used for matching whether a character string is a keyword "time" followed by a blank, or a keyword "now" followed by a tab, and then a numeral of 3 to 5, and finally a time unit of second (s). FIG. 1 is a schematic structural view of state transferring of FA after RE conversion. As shown in FIG. 1, each circle represents a state, and the numeral in the circle represents an index of the state. In FIG. 1, from a start state "0", one character is processed each time, and each time an effective character (character tagged on an arrow line between states represented by two circles) is input, a next state is entered. Upon matching, when an input character is not acceptable for the state, return to the start state "0". In a state "11" and a state "12", if an input character is "\d", enter a corresponding next state "12" or a state "13". If an input character is "s", enter a state "14", where the state "14" is an accept state and is expressed by two concentric circles. If matching is performed to the accept state, it indicates that the matching is successful, and if the accept state is not reached after the target character string is processed, it indicates that the matching is failed. The two-dimensional storage structure corresponding to the FA is as shown in Table 1.

TABLE 1

| Index | Accept state | Others | t | i | m | e | \x20 | n | o | w | \t | 0-9 | s |
|---|---|---|---|---|---|---|---|---|---|---|---|---|---|
| 0 | 0 | 0 | 1 | | | | 5 | | | | | | |
| 1 | 0 | 0 | | 2 | | | | | | | | | |
| 2 | 0 | 0 | | | 3 | | | | | | | | |
| 3 | 0 | 0 | | | | 4 | | | | | | | |
| 4 | 0 | 0 | | | | | 8 | | | | | | |
| 5 | 0 | 0 | | | | | | 6 | | | | | |
| 6 | 0 | 0 | | | | | | | 7 | | | | |
| 7 | 0 | 0 | | | | | | | | 8 | | | |
| 8 | 0 | 0 | 0 | | | | | | | | | 9 | |
| 9 | 0 | 0 | 0 | | | | | | | | | 10 | |
| 10 | 0 | 0 | 0 | | | | | | | | | 11 | |
| 11 | 0 | 0 | 0 | 0 | | | | | | | | 12 | 12 |
| 12 | 0 | 0 | 0 | 0 | | | | | | | | 13 | 13 |
| 13 | 0 | 0 | 0 | 0 | | | | | | | | | 14 |
| 14 | 1 | 0 | 0 | 0 | 0 | 0 | 0 | 0 | 0 | 0 | 0 | 0 | 0 |

Generally, in an FA state table, each column represents a ASCII character, so Table 1 should have 256 columns but for the sake of convenient description and display, characters that are not present in RE "(time\x20|now\t)\d{3,5}s" are uniformly represented by an "others" column. All the cells in the column are "0", and accordingly, each state in FIG. 1 is corresponding to a row in Table 1, and the other blanks are "0".

When performing matching on a target character string according to Table 1, the start state is assigned to be "0", and a target character is read from the start state in sequence, with the state number as a row index and the character as a column index, whereby a target state value is found and is assigned to the current state. It is determined whether the "accept state" column of the row where the state is in is 1, and if yes, the matching is successful and matching is completed. If the matching is not successful after the input of the target character string is completed, the matching is failed.

If the RE is "(time\x20|now\t)\d{3,5}s", where the string "time\x20" is corresponding to State 0 to State 4, the five states are similar to one another. That is, after an effective character is input, the state transfers to a next state. Otherwise, the state transfers to State 0. Similarly, "\d{3,5}" is corresponding to State 8 to State 12, the five states are still similar to one another. That is, when a numeral is input, the state transfers to a next state, and when inputting "s" at a state meeting numeral number, the state transfers to State 14. Otherwise, the state transfers to State 0. Thus, in the two-dimensional storage structure shown in Table 1, when the transferring states of the continuous character in corresponding RE are similar to one another, lots of redundancy is generated by storage structure. For example, when the transferring states represented by the RE are increased, the generated redundancy and the occupied memory space are increased in proportion. Thus, in the two-dimensional storage structure shown in Table 1, when the state number is less than 256, the state index in each cell may be represented by a byte, and thus the storage space required by each row is 256 bytes. When the state number is in the range of 256 and 65536, the state index in each cell is required to be represented by two types, and thus the storage space required by each row is 512 bytes. Therefore, the more the state number is, the more the byte number occupied by each cell is, and accordingly the larger the occupied memory space is.

SUMMARY OF THE DISCLOSURE

Accordingly, the present disclosure is directed to a method and device for compressing a table based on FA, and a method and device for matching a table, so as to reduce redundancy table items in a two-dimensional structure table of the current FA, and thus the memory space occupied by the two-dimensional structure table is reduced.

In order to realize the objectives of the present disclosure, the present disclosure provides the following technical solutions.

The present disclosure provides a method for compressing a table based on FA, where the method includes the following steps: transfer characteristics of all states in an original two-dimensional structure table are analyzed and continual states with unified transferring characteristics in the original two-dimensional structure table are combined.

The present disclosure provides a device for compressing a table based on FA, where the device includes an analyzing unit and a combining unit.

The analyzing unit is configured to analyze transferring characteristics of all states in an original two-dimensional structure table.

The combining unit is configured to combine continual states with unified transferring characteristics in an original two-dimensional structure table.

The present disclosure provides a method for matching a table based on FA, where the table is a two-dimensional structure table generated through the method for compressing the tables as described above and where the method includes the following steps: the two-dimensional structure table is searched according to a read target character of a current state, and a next state corresponding to the target character is recorded and transfer from the current state to the next state when a continuous character string starting from the target character is judged to be conforming to supplementary control attributes corresponding to the target character.

The present disclosure provides a device for matching a table based on FA where the table is a two-dimensional structure table generated through the method for compressing a table as described above, and the device includes a storage unit, a search unit, and transferring unit. The storage unit is configured to store the two-dimensional structure table. The search unit is configured to search the two-dimensional structure table according to a read target character of the current state, and record a next state corresponding to the target character. The transferring unit is configured to transfer from the current state to the next state when a continuous character string starting from the target character is judged to be conforming to supplementary control attributes corresponding to the target character.

It can be seen from the technical solution of the present disclosure that the transferring characteristics of all states in an original two-dimensional structure table are analyzed, and then continual states with unified transferring characteristics in the original two-dimensional structure table are combined. According to the embodiments applying the method for compressing a table of the present disclosure, through combining similar states in the original two-dimensional structure table into one state, similar transferring states of the continuous characters in a RE are compressed, and thus a substantial degree of redundancy generated due to the similar states in the storage structure is reduced, and the memory space is saved. Accordingly, when the number of states in the original two-dimensional structure table is large, the total number of the states is dropped through compressing a table, and thus the byte number required for state index of a cell is dropped correspondingly, and the memory consumption is reduced.

DETAILED DESCRIPTION OF THE EMBODIMENTS

A method and device for compressing a table based on FA and a method and device for matching a table are provided in order to analyze transferring characteristics of all states in an original two-dimensional structure table and combine continual states with unified transferring characteristics in the original two-dimensional structure table.

In order to enable persons of ordinary skill in the art to understand the technical solutions of the present disclosure more comprehensively, the technical solutions of the present disclosure are described in further detail with reference to the following drawings and specific embodiments.

Figure 2:
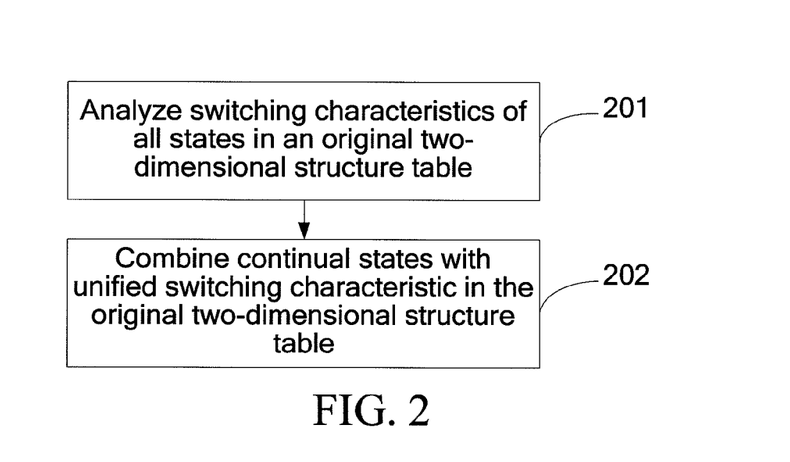
FIG. 2 is a flow chart of a first embodiment of a method for compressing a table based on FA according to the present disclosure.

FIG. 2 is a flow chart of a first embodiment of a method for compressing a table based on FA according to the present disclosure.

In step 201, transferring characteristics of all states in an original two-dimensional structure table are analyzed.

After analyzing the transferring characteristics of all states, a reference set is constructed for each state, and the reference set includes all states capable of transferring to each state.

In step 202, continual states with unified transferring characteristics in the original two-dimensional structure table are combined.

Specifically, the original two-dimensional structure table is scanned in sequence, a same state index is allocated for continual states with unified transferring characteristics, and supplementary control attributes are added for the continual states where the supplementary control attributes include information of the transferring characteristics. The state indexes allocated to the continual states and the corresponding supplementary control attributes are converted into a new two-dimensional structure table. States in the two-dimensional structure table are arranged in a sequence of the allocated state indexes.

The continual states with unified transferring characteristics include that the continual states transfer to a next state after a character is input where a reference set of the continual states includes a unique state, or the continual states transfer to a next state when meeting an inputting frequency range of number where states meeting values between a minimal value and a maximal value of the inputting range transfer to the same transfer state, and the reference set of the continual states includes a unique state.

The supplementary control attributes may include a first character of a character string corresponding to the continual states with unified transferring characteristics and a succeeding character string and a failure state when the continual states do not conform to the corresponding character string. Alternatively, the supplementary control attributes may include a current character set corresponding to the continual states with unified transferring characteristics, a minimal inputting number and a maximal inputting number of the character set, a transition character and a transition transferring state, and a failure state when the continual states do not conform to the corresponding character string.

Figure 3:
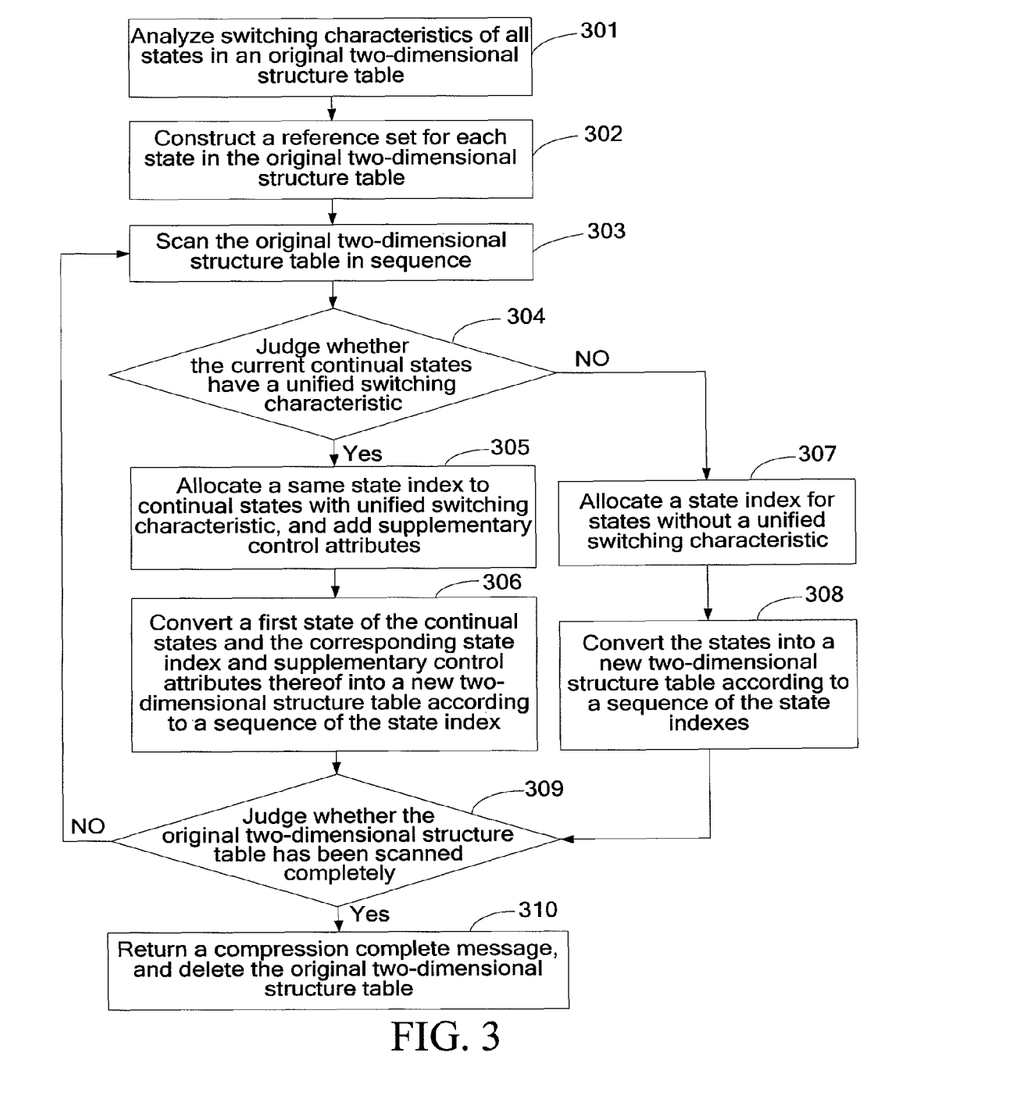
FIG. 3 is a flow chart of a second embodiment of a method for compressing a table based on FA according to the present disclosure.

FIG. 3 is a flow chart of a second embodiment of a method for compressing tables based on FA according to the present disclosure. Referring to FIG. 2, in this embodiment, a detailed process for compressing an original two-dimensional structure table is exemplified.

In step 301, transferring characteristics of all states in an original two-dimensional structure table are analyzed.

In step 302, a reference set is constructed for each state in the original two-dimensional structure table.

In step 303, the original two-dimensional structure table is scanned in sequence.

In step 304, it is judged whether the current continual states have unified transferring characteristics, and if yes, step 305 is performed. Otherwise, step 307 is performed.

In step 305, a same state index is allocated to continual states with unified transferring characteristics, and supplementary control attributes are added to the continual states.

In step 306, a first state of the continual states and the corresponding state index and supplementary control attributes thereof are converted into a new two-dimensional structure table according to a sequence of the state indexes, and step 309 is then performed.

In step 307, state indexes are re-allocated for states without unified transferring characteristics.

In step 308, the states are converted into the new two-dimensional structure table according to a sequence of the state indexes.

In step 309, it is judged whether the original two-dimensional structure table has been scanned completely, and if yes, step 310 is performed. Otherwise, the process returns to step 303.

In step 310, a compression complete message is returned, and the original two-dimensional structure table is deleted, and the current process ends.

According to the method for compressing a table in the embodiment of the present disclosure, with RE "(time\x20|now\t)\d{3,5} s" as an example, the compression process of a two-dimensional data structure based on FA is described as follows.

An original two-dimensional storage structure corresponding to RE "(time\x20|now\t)\d{3,5}s" is as shown in FIG. 1. As for each state in FIG. 1, all states capable of transferring to the state are recorded as a reference set of the state. For example, the state capable of transferring to State 3 is State 2, so the reference set of State 3 has State 2 recorded therein. The states capable of transferring to State 8 include State 4 and State 7, so the reference set of State 8 has State 4 and State 7 recorded therein. Further, for example, in Table 1, the states capable of transferring to State 0 include State 0 to State 14, so the reference set of State 0 has State 0 to State 14 recorded therein.

The two-dimensional storage structure table 1 is scanned, as for "time\x20", each state from State 0 to State 4 transfers to a next state after a letter meeting the requirement is input, and the reference set of each state is corresponding to a unique reference state. Similarly, as for "now\t", each state from State 0 and States 5 to 7 transfers to a next state after a letter meeting the requirement is input, and the reference set of each state also corresponds to a unique reference state. Therefore, the states that have similar transferring characteristics are re-identified by a unified new index. As the start state of both is State 0, the re-numbered new index corresponding to the original State 1 to State 4 and State 5 to State 7 is "0". Next, supplementary control attributes are set for the new index 0, and the format of the supplementary control attributes is F (current character: succeeding character string), and such format may have multiple groups, for example, the format corresponding to "time\x20|now\t" includes two groups, that is, F (t:ime\x20, n:ow\t). Further, failure state attributes are added in the supplementary control attributes. In this embodiment, the failure state is State "0", therefore the final supplementary control attributes are "0,F (t:ime\x20, n:ow\t)". As for "\d{3,5}", from State 8, there may be three to five states, which transfer to the next state after any numeral is input and have the same state transferring from State 11 to State 13. That is, the states are capable of transferring to State 14, and the reference set of each state is corresponding to a unique reference state. Therefore, the states have similar transferring characteristics may also be re-identified by a unified new index. As the new index of the first half of the RE "time\x20|now\t" is "0", the re-numbered new index corresponding to the original State 8 to State 13 is "1". Next, supplementary control attributes are set for "\d{3,5}", and the supplementary attributes have a format of M (current character set: minimal number-maximal number, transition character: transition transferring), and there may be multiple pairs. Corresponding to the embodiment of the present disclosure, the final supplementary control attributes with the failure state added therein is "0 μM (\d:3-5,s: 3)". With regards to the State 13 that does not meet the combination requirement and the final State 14, new indexes "2" and "3" numbered in sequence are directly allocated. Through the operation of combination, re-allocation of new indexes, and adding supplementary control attributes for the combined new index, the formed two-dimensional intermediate state table is as shown in the following Table 2.

TABLE 2

| Index | Accept state | Supplementary Control Attributes | Others | t | i | m | e | \x20 | n | o | w | \t | 0-9 | s | New Index |
|---|---|---|---|---|---|---|---|---|---|---|---|---|---|---|---|
| 0 | 0 | 0,F(t:ime\x20,n:ow\t) | 0 | 1 |   |   |   |   | 5 |   |   |   |   |   | 0 |
| 1 | 0 |   | 0 |   | 2 |   |   |   |   |   |   |   |   |   | 0 |
| 2 | 0 |   | 0 |   |   | 3 |   |   |   |   |   |   |   |   | 0 |
| 3 | 0 |   | 0 |   |   |   | 4 |   |   |   |   |   |   |   | 0 |
| 4 | 0 |   | 0 |   |   |   |   | 8 |   |   |   |   |   |   | 0 |
| 5 | 0 | 0,M(\d:3-5,s:3) | 0 |   |   |   |   |   | 6 |   |   |   |   |   | 0 |
| 6 | 0 |   | 0 |   |   |   |   |   |   | 7 |   |   |   |   | 0 |
| 7 | 0 |   | 0 |   |   |   |   |   |   |   | 8 |   |   |   | 0 |
| 8 | 0 |   | 0 | 0 |   |   |   |   |   |   |   |   | 9 |   | 1 |
| 9 | 0 |   | 0 | 0 |   |   |   |   |   |   |   |   | 10 |   | 1 |
| 10 | 0 |   | 0 | 0 |   |   |   |   |   |   |   |   | 11 |   | 1 |
| 11 | 0 |   | 0 | 0 | 0 |   |   |   |   |   |   |   | 12 | 12 | 1 |
| 12 | 0 |   |   | 0 | 0 |   |   |   |   |   |   |   | 13 | 13 | 1 |
| 13 | 0 |   |   | 0 | 0 |   |   |   |   |   |   |   |   | 14 | 2 |
| 14 | 1 |   |   | 0 | 0 | 0 | 0 | 0 | 0 | 0 | 0 | 0 | 0 | 0 | 3 |

The intermediate state table 2 contains transferring state information in the original two-dimensional structure table and still occupies a substantial amount of memory. Therefore, after re-scanning the Table 2, the new state index and supplementary control attributes are converted into the new two-dimensional structure table. That is, the original transferring state indexes are replaced by new transferring state indexes, and the compressed two-dimensional structure table generated finally is as shown in the following Table 3.

TABLE 3

| Index | Accept state | Supplementary Control Attributes | Others | t | n | \d | s |
|---|---|---|---|---|---|---|---|
| 0 | 0 | 0,F(t:ime\x20,n:ow\t) | 0 | 1 | 1 |   |   |
| 1 | 0 | 0,M(\d:3-5,s:3) | 0 |   |   | 2 |   |
| 2 | 0 |   | 0 |   |   |   | 3 |
| 3 | 1 |   | 0 | 0 | 0 | 0 | 0 |

Figure 4:
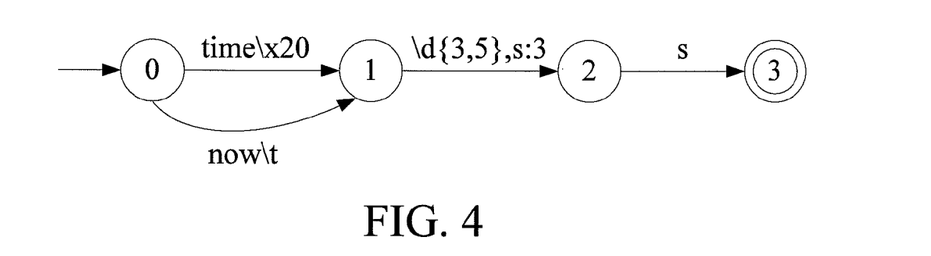
FIG. 4 is a schematic structural view of state transferring of FA according to the present disclosure.

According to the compressed two-dimensional structure table 3, a schematic view of a new state transferring of FA is as shown in FIG. 4. Referring to FIG. 4, from start state 0, a continuous character string in a target character may be processed according to supplementary control attributes corresponding to the combined state as opposed to processing only one character. That is to say, when the current target character string read in sequence meets the supplementary control attributes F(t:ime\x20,n:ow\t), transfer from State 0 to State 1. When the current target character string read in sequence meets supplementary control attributes M(\d:3-5,s:3), transfer from State 1 to State 2, and when character "s" is read, transfer from State 2 into accept state 3. It can be seen that the tables compressed by using the method according to the embodiments of the present disclosure merely include 4 transferring states and thus, compared with 15 transferring states in the prior art, the storage space is reduced significantly.

Corresponding to the method for compressing tables based on FA of the present disclosure, a method for matching a table based on FA is also provided.

Figure 5:
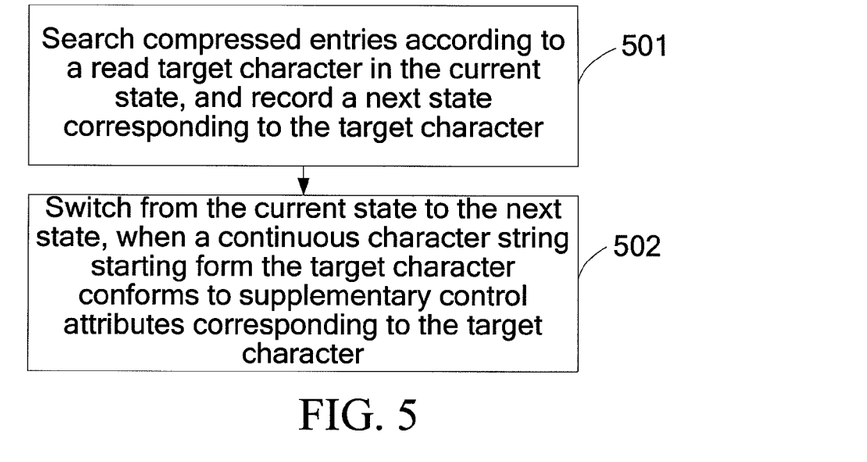
FIG. 5 is a flow chart of a first embodiment of a method for matching a table based on FA according to the present disclosure.

FIG. 5 is a flow chart of a first embodiment of a method for matching a table based on FA according to the present disclosure.

In step 501, the compressed table is searched according to a read target character in a current state, and a next state corresponding to the target character is recorded.

In step 502, when a continuous character string starting form the target character conforms to supplementary control attributes corresponding to the target character, transfer from the current state to the next state.

Figure 6:
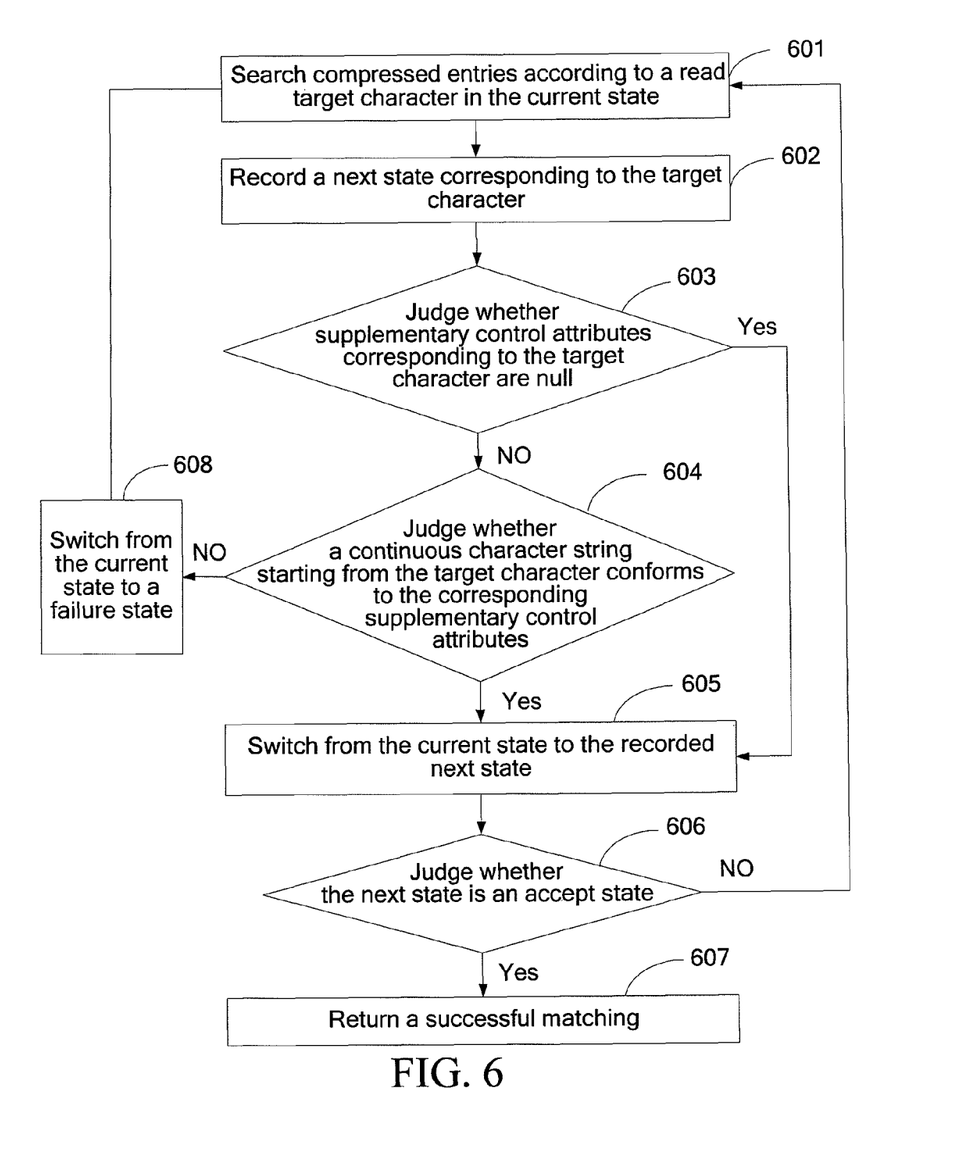
FIG. 6 is a flow chart of a second embodiment of a method for matching a table based on FA according to the present disclosure.

FIG. 6 is a flow chart of a second embodiment of a method for matching a table based on FA according to the present disclosure. In this embodiment, a process for matching RE through a compressed two-dimensional structure table is exemplified in detail.

In step 601, the compressed table is searched according to a read target character in a current state.

In step 602, a next state corresponding to the target character is recorded.

In step 603, it is judged whether supplementary control attributes corresponding to the target character are null, and if not, step 604 is performed. If yes, step 605 is performed.

In step 604, it is judged whether a continuous character string starting from the target character conforms to the corresponding supplementary control attributes, and if yes, step 605 is performed. If not, step 608 is performed.

In step 605, transfer from the current state to the next state recorded.

In step 606, it is judged whether the next state is an accept state, and if yes, step 607 is performed. If not, step 601 is performed.

In step 607, return a successful matching, and the current process ends.

In step 608, transfer from the current state to a failure state, and return to step 601.

Still taking matching RE "(time\x20|now\t)\d{3,5}s" as an example, and assuming that a target character string is "time 2468 s", the matching process using the compressed two-dimensional structure table 3 is described as follows.

Starting from a start state 0, a first character of the target character string is read to be "t", a next state corresponding to "t" is searched to be 1 according to Table 3, state 1 is recorded, and, simultaneously, supplementary control attributes of state 0 are queried to be "0,F(t:ime\x20,n:ow\t)" which indicates that there is a requirement of succeeding character string on the current character "t". At this time, the succeeding character string in the supplementary control attributes is compared with a character string having the same length after the character "t" in the target character string. As the comparison result of the two character strings is equal, the recorded state 1 is considered as a current state.

A first character after "time" is continuously read to be "2" according to the Table 3, a next state corresponding to "2" is searched to be 2, a state 2 is recorded, and, simultaneously, supplementary control attributes of state 1 are queried to be "0,M(\d:3-5,s:3)" which indicates that there is a requirement of repeating 3 to 5 times on numerals 0-9. At this time, a character after the character "2" in the target character string is read circularly, and a counter is correspondingly added with 1. As three continuous characters are numerals, the requirement of minimal value in the supplementary control attributes is met. A fourth character "8" is read, and a current value after the counter is added with 1 is 4 which does not exceed the requirement on the maximal value in the supplementary control attributes, and the current state is maintained to be constant.

A character "s" is continuously read, and according to the supplementary control attributes of the current State 1, "s" is a transition character, and the corresponding next state is 3. The state 3 is considered as a current state, an accept state corresponding to state 3 in the Table 3 is searched to be "1" which indicates that the matching of the target character string is completed, and a successful matching message is returned. It should be noted that, the matching process is described with a successful matching as an example, and when the matching of the target character string is failed, transfer to failure state 0.

Corresponding to the embodiment of the method for compressing a table based on FA, an embodiment of a device for compressing a table based on FA is provided in the present disclosure.

Figure 7:
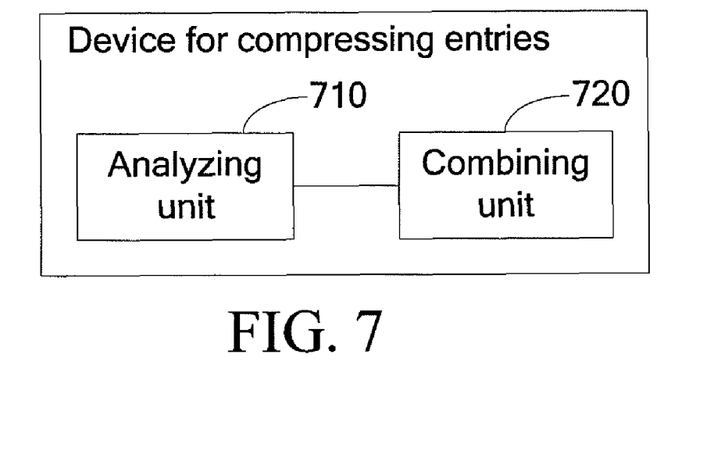
FIG. 7 is a block diagram of a first embodiment of a device for compressing a table based on FA according to the present disclosure.

FIG. 7 is a block diagram of a first embodiment of a device for compressing a table based on FA according to the present disclosure. Referring to FIG. 7, the device includes an analyzing unit 710 and a combining unit 720.

The analyzing unit 710 is configured to analyze transferring characteristics of all states in an original two-dimensional structure table. The combining unit 720 is configured to combine continual states with unified transferring characteristics in the original two-dimensional structure table.

Figure 8:
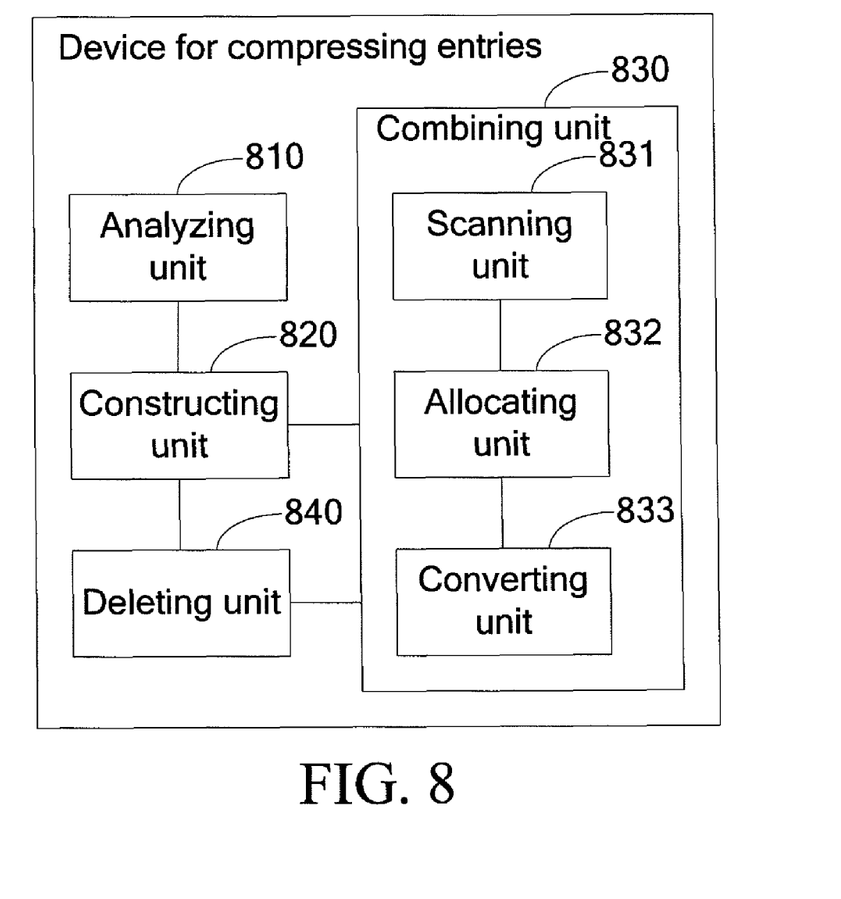
FIG. 8 is a block diagram of a second embodiment of a device for compressing a table based on FA according to the present disclosure.

FIG. 8 is a block diagram of a second embodiment of a device for compressing a table based on FA according to the present disclosure.

Referring to FIG. 8, the device includes an analyzing unit 810, a constructing unit 820, a combining unit 830, and a deleting unit 840. The analyzing unit 810 is configured to analyze transferring characteristics of all states in an original two-dimensional structure table. The constructing unit 820 is configured to construct a reference set for each state in the original two-dimensional structure table, and the reference set includes all states capable of transferring to the state. The combining unit 830 is configured to combine continual states with unified transferring characteristics in the original two-dimensional structure table. The deleting unit 840 is configured to delete the original two-dimensional structure table.

The combining unit 830 includes a scanning unit 831, an allocating unit 832, and a converting unit 833. The scanning unit 831 is configured to scan the original two-dimensional structure table in sequence. The allocating unit 832 is configured to allocate a same state index for continual states with unified transferring characteristics, add supplementary control attributes for the continual states, and re-allocate state indexes for states without unified transferring characteristics where the supplementary control attributes include information of the transferring characteristics. The converting unit 833 is configured to convert a first state of the continual states and a corresponding state index and supplementary control attributes thereof into the new two-dimensional structure table. The states in the new two-dimensional structure table are arranged in the sequence of the state indexes, and the states without unified transferring characteristics are converted into the new two-dimensional structure table according to the sequence of the state indexes.

Corresponding to the embodiment of the method for matching a table based on FA, an embodiment of a device for matching a table based on FA is provided.

Figure 9:
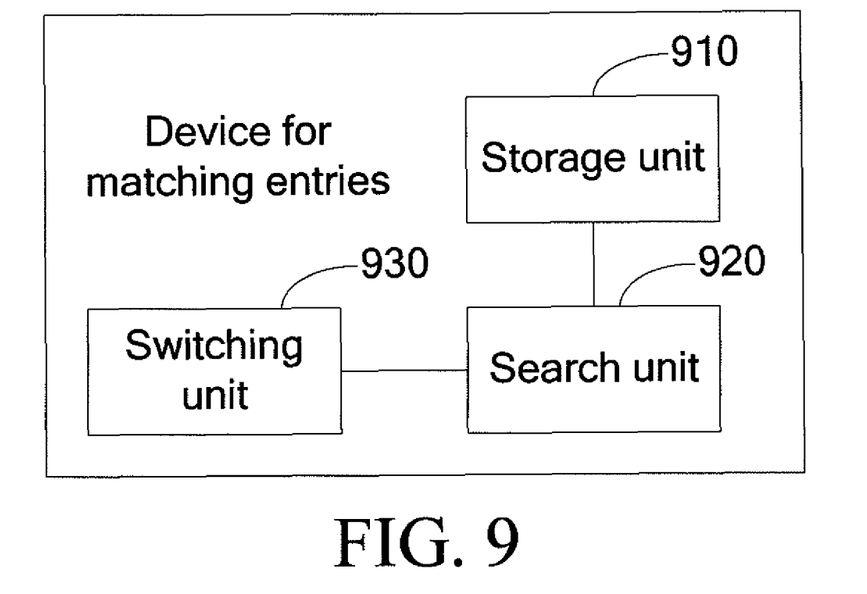
FIG. 9 is a block diagram of a first embodiment of a device for matching a table based on FA according to the present disclosure.

FIG. 9 is a frame diagram of a first embodiment of a device for matching a table according to the present disclosure. Referring to FIG. 9, the device includes a storage unit 910, a search unit 920, and a transferring unit 930.

The storage unit 910 is configured to store a compressed two-dimensional structure table. The search unit 920 is configured to search the two-dimensional structure table according to a read target character in a current state, and record a next state corresponding to the target character. The transferring unit 930 is configured to transfer from the current state to the next state when a continuous character string starting from the target character is judged to be conforming to supplementary control attributes corresponding to the target character.

Figure 10:
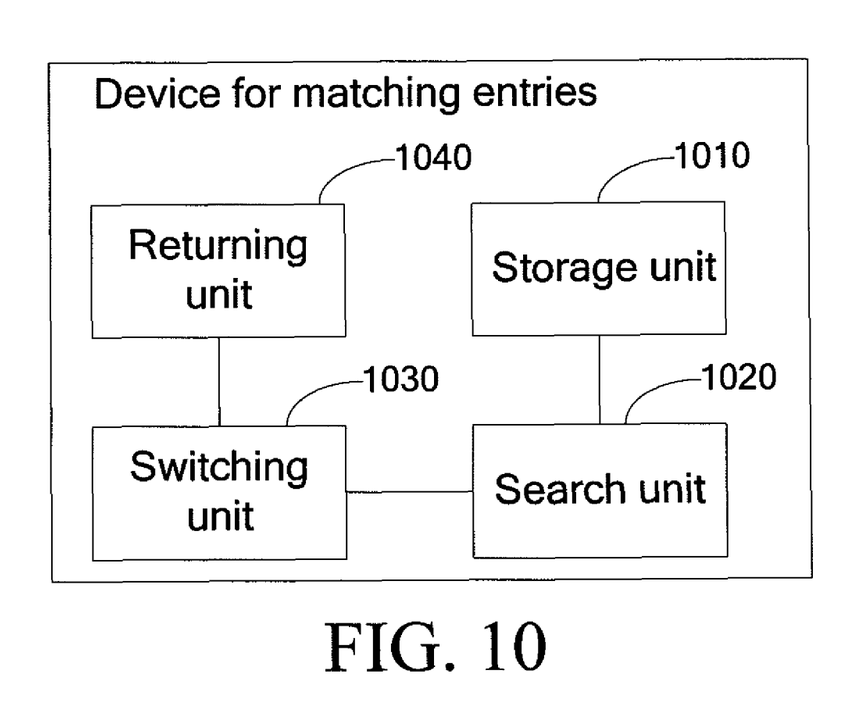
FIG. 10 is a block diagram of a second embodiment of a device for matching a table based on FA according to the present disclosure.

FIG. 10 is a frame diagram of a second embodiment of a device for matching a table according to the present disclosure. Referring to FIG. 10, the device includes a storage unit 1010, a search unit 1020, a transferring unit 1030, and a returning unit 1040.

The storage unit 1010 is configured to store a compressed two-dimensional structure table. The search unit 1020 is configured to search the two-dimensional structure table according to a read target character in a current state, and record a next state corresponding to the target character. The transferring unit 1030 is configured to transfer from the current state to the next state when a continuous character string starting from the target character is judged to be conforming to supplementary control attributes corresponding to the target character, transfer from the current state to a failure state when the continuous character string starting from the target character is judged not to be conforming to supplementary control attributes corresponding to the target character, and transfer from the current state to the next state when supplementary control attributes corresponding to the target character is judged to be null. The returning unit 1040 is configured to return a successful matching when the next state is an accept state.

Through the description of the embodiments of the present disclosure, by applying the embodiment of the method for compressing a table of the present disclosure, the similar states in the original two-dimensional structure table are combined into one state, that is, the similar transferring states of continuous characters in the RE are compressed, and thus lots of redundancy generated by similar states in the storage structure is reduced, thereby saving the memory space. Accordingly, if the number of states in the original two-dimensional structure table is large, when the total number of states is reduced by compressing the table, the byte number required by the state index of the cell is reduced accordingly, and thus the memory consumption is reduced.

Those of ordinary skill in the art should understand that all or a part of the steps of the method according to the embodiments of the present disclosure may be implemented by a program instructing relevant hardware such as a processor. The program may be stored in a non-transitory computer readable storage medium. When the program is run (i.e., executed, for example, by the processor) to compress the table, the following steps are performed. Transfer characteristics of all states in an original two-dimensional structure table are analyzed. Continual states with unified transferring characteristics in the original two-dimensional structure table are combined. When the program is run to match the table, the following steps are included. The table is searched according to read target character in a current state, and a next state corresponding to the target character is recorded. When a continuous character string starting from the target character is judged to be conforming to supplementary control attributes corresponding to the target character, a transfer is performed from the current state to the next state. The non-transitory computer readable storage medium may include, for example, a ROM/RAM, a magnetic disk, and/or an optical disk.

Although the disclosure has been described through some exemplary embodiments, the disclosure is not limited to such embodiments. It is apparent that those skilled in the art can make various modifications and variations to the disclosure without departing from the spirit and scope of the present disclosure. The appended claims of the present disclosure are intended to cover those modifications and variations.

What is claimed is:

1. A method for compressing a table based on finite automata (FA), comprising:
   analyzing transferring characteristics of all states in an original two-dimensional structure table; and
   combining continual states with unified transferring characteristics in the original two-dimensional structure table;
   wherein combining the continual states with unified transferring characteristics comprises:
   scanning the original two-dimensional structure table in sequence;
   allocating a same state index for the continual states with unified transferring characteristics and adding supplementary control attributes for the continual states, wherein the supplementary control attributes comprise information of the transferring characteristics that indicates how a state transfers to a next state; and
   converting the state index allocated for the continual states and the corresponding supplementary control attributes into a new two-dimensional structure table, wherein states in the new two-dimensional structure table are arranged according to a sequence of the allocated state indexes;
   wherein the continual states with unified transferring characteristics comprise:
   when the continual states that transfer to a next state after when a character is input, wherein the continual states transfer to a next state and a reference set of the continual states comprises a unique state; and
   the continual states that transfer to a next state when meeting an inputting frequency range of numbers is met, wherein the continual states transfer to a next state while states meeting values between a minimal value and a maximal value of the inputting frequency range transfer to a same transferring state, and the reference set of the continual states comprises the unique state.

2. The method according to claim 1, wherein after the analyzing the transferring characteristics of all states, the method further comprises:
   constructing a reference set for each state in the original two-dimensional structure table, wherein the reference set comprises all states configured to transfer to each of the states.

3. The method according to claim 2, further comprising:
   re-allocating the state indexes for states without unified transferring characteristics; and
   converting the states without unified transferring characteristics into the new two-dimensional structure table according to the sequence of the allocated state indexes.

4. The method according to claim 3, further comprising deleting the original two-dimensional structure table.

5. The method according to claim 1, wherein the supplementary control attributes comprises:
   a first character of a character string corresponding to the continual states with the unified transferring characteristics and a succeeding character string, and a failure state when the continual states do not conform to the corresponding character string; or
   a current character set corresponding to the continual states with unified transferring characteristics, a minimal inputting number and a maximal inputting number of the current character set, transition character and transition transferring state, and a failure state when the continual states do not conform to the corresponding character string.

6. A method for matching a table based on finite automata (FA), wherein the table is the two-dimensional structure table generated through the method for compressing a table according to claim 1, and the method comprises:
   searching the two-dimensional structure table according to a read target character of a current state and recording a next state corresponding to the read target character; and
   transferring from the current state to the next state when a continuous character string starting from the target character is judged to be conforming to supplementary control attributes corresponding to the target character.

7. The method according to claim 6, further comprising:
   transferring from the current state to a failure state when the continuous character string starting from the target character does not conform to the supplementary control attributes corresponding to the target character; or
   transferring from the current state to the next state when the supplementary control attributes corresponding to the target character are null.

8. The method according to claim 6, further comprising:
   returning a successful matching when the next state is an accept state.

9. A hardware device having a processor for matching a table based on finite automata (FA), wherein the table is the two-dimensional structure table generated through the method for compressing a table according to claim 1, and the device comprises:
   a non-transitory storage unit configured to store the two-dimensional structure table;
   a search unit, configured to search the two-dimensional structure table according to a read target character of a current state and record a next state corresponding to the read target character; and
   a transferring unit configured to transfer from the current state to the next state when a continuous character string starting from the target character is judged to be conforming to supplementary control attributes corresponding to the target character.

10. The device according to claim 9, wherein the transferring unit is further configured to transfer from the current state to a failure state when the continuous character string starting from the target character does not conform to the supplementary control attributes corresponding to the target character; or transfer from the current state to the next state when the supplementary control attributes corresponding to the target character are null.

11. The device according to claim 9, further comprising:
a returning unit configured to return a successful matching when the next state is an accept state.

12. A hardware device having a processor for compressing a table based on finite automata (FA), comprising:
an analyzing unit configured to analyze transferring characteristics of all states in an original two-dimensional structure table stored in a non-transitory storage medium; and
a combining unit configured to combine continual states with unified transferring characteristics in the original two-dimensional structure table;
wherein the combining unit comprises:
a scanning unit configured to scan the original two-dimensional structure table in sequence;
an allocating unit configured to allocate a same state index for the continual states with unified transferring characteristics, and add supplementary control attributes for the continual states, wherein the supplementary control attributes comprise information of the transferring characteristics that indicates how a state transfers to a next state; and
a converting unit configured to convert the state indexes allocated for the continual states and corresponding supplementary control attributes into a new two-dimensional structure table, wherein states in the new two-dimensional structure table are arranged according to a sequence of the allocated state indexes;
wherein the continual states with unified transferring characteristics comprise:
when the continual states that transfer to a next state after when a character is input, wherein the continual states transfer to a next state and a reference set of the continual states comprises a unique state; and
the continual states that transfer to a next state when meeting an inputting frequency range of numbers is met, wherein the continual states transfer to a next state while states meeting values between a minimal value and a maximal value of the inputting frequency range transfer to a same transferring state, and the reference set of the continual states comprises the unique state.

13. The device according to claim 12, further comprising:
a constructing unit configured to construct a reference set for each state in the original two-dimensional structure table, wherein the reference set comprises all states configured to transfer to each of the states.

14. The device according to claim 13, wherein the allocating unit is further configured to re-allocate state indexes for states without unified transferring characteristics; and
the converting unit is further configured to convert the states without unified transferring characteristics into a new two-dimensional structure table according to a sequence of the allocated state indexes.

15. The device according to claim 13, further comprising:
a deleting unit configured to delete the original two-dimensional structure table.

* * * * *